Figure 1:
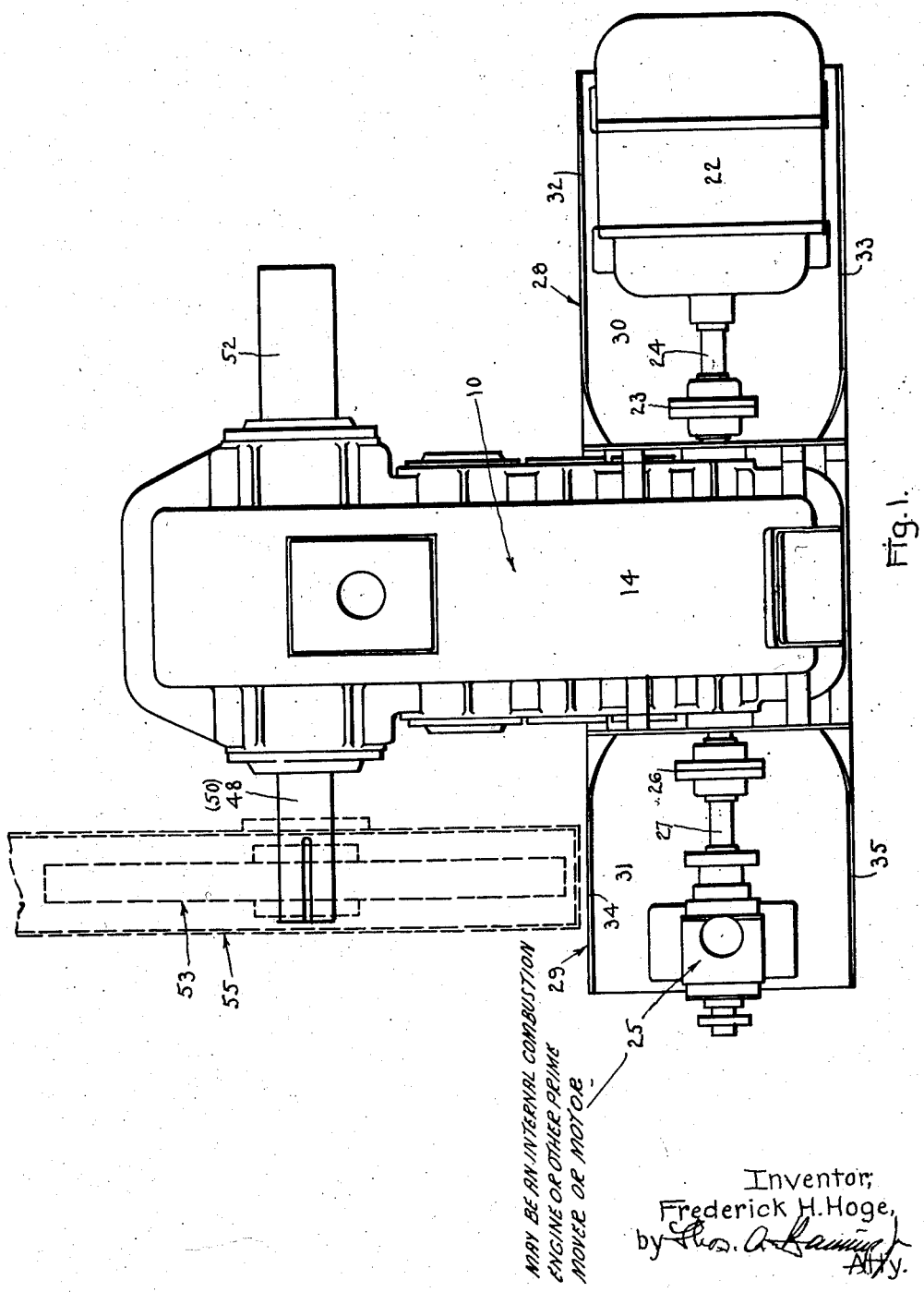

March 11, 1958 F. H. HOGE 2,826,096
DUPLEX DRIVE GEAR SPEED REDUCERS, AND THE LIKE
Filed June 1, 1955 4 Sheets-Sheet 1

Inventor;
Frederick H. Hoge,
by
Atty.

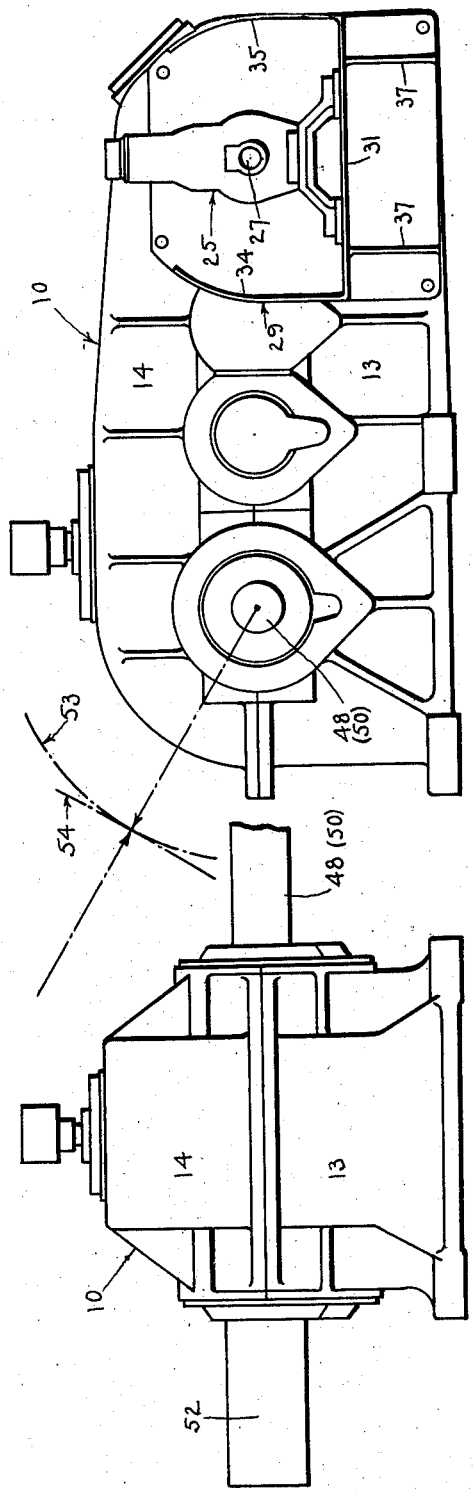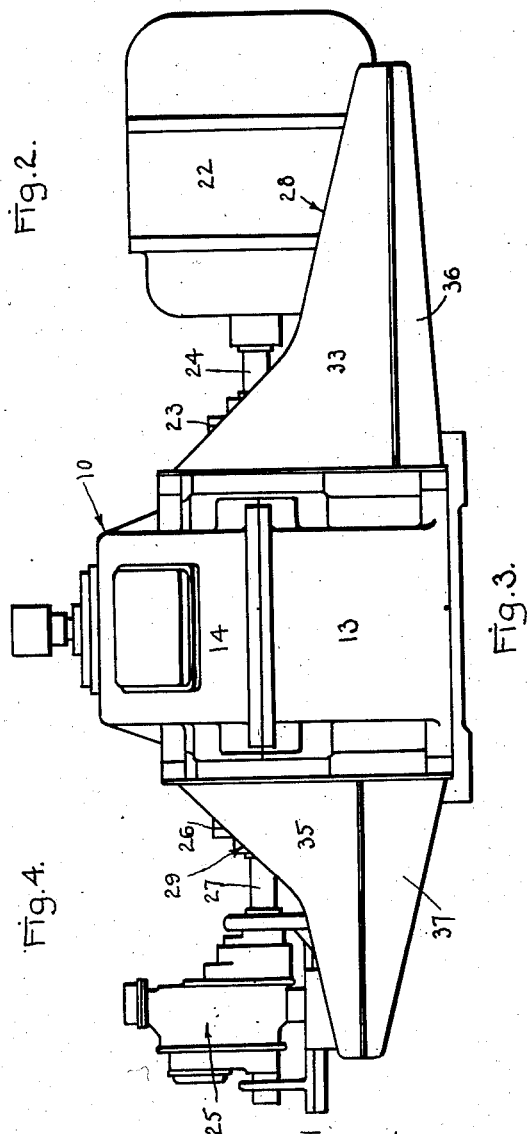

March 11, 1958   F. H. HOGE   2,826,096
DUPLEX DRIVE GEAR SPEED REDUCERS, AND THE LIKE
Filed June 1, 1955   4 Sheets-Sheet 3

Inventor:
Frederick H. Hoge,
by
Atty.

Inventor:
Frederick H. Hoge,

# United States Patent Office 2,826,096
Patented Mar. 11, 1958

2,826,096

DUPLEX DRIVE GEAR SPEED REDUCERS, AND THE LIKE

Frederick H. Hoge, Oak Park, Ill., assignor, by mesne assignments, to Hewitt-Robins Incorporated, Stamford, Conn., a corporation of New York Application June 1, 1955, Serial No. 512,417

9 Claims. (Cl. 74—665)

This invention relates to improvements in duplex drive gear speed reducers, and the like. The invention concerns itself primarily with improvements in gear speed reducers of such construction that the power input to the power delivery phase of the gear train may be delivered selectively from either of two power input connections. Thereby the delivery of power to the power receiving element may be from either of such two power input connections as desired, or from both of them simultaneously.

The unit disclosed and detailed hereinafter includes the provision of at least two power input connections which are driven by independent power units such as electric motors, internal combustion engines, steam engines or turbines, air motors, or other power developing units. The unit of the present invention is provided with a single power receiving element, such as a shaft, to which the powers supplied through said input connections are delivered, in such manner that either or both of the power input connections acts to drive the power receiving element in the same direction. From such single power receiving element the power may then be delivered to the power consuming unit either directly or through a gear train or other transmitting section. The arrangement is such that drive may be effected from either power input connection to the power receiving element independently, or both of the power input connections may deliver power to the power receiving element simultaneously, but in any case the power drive or drives to the power receiving element is or are always in the same direction. The arrangement is also such that delivery of power to the power receiving element may be effected from either power input connection selectively during the continuous running of the unit and without interruption to the continued operation of the power receiving element. Such transfer of power may be effected with either an increase or a decrease of speed of the power receiving element; but the arrangement is such that any such transfer of power is effected smoothly and without the need of effecting any manual or special connecting or disconnecting operations.

To effect the foregoing and other operations and objectives the present unit includes a single power receiving element in the form a shaft, two power input connections in the form of two shafts in proximity to the power receiving element, power drive units in connection with said power input shafts, and independent "free-wheeling" drive connections from the two power input shafts to the power receiving shaft, both of said free-wheeling drive power connections being adapted for drive of the single power receiving shaft in the same rotative direction, and each of said free-wheeling drive connections being of a form permitting the power receiving shaft to be rotated at speed greater than the driving speed then being produced by the corresponding power input unit. Thus, whenever the driving speed produced by either of the power supplying units exceeds the driving speed produced by the other power supplying unit, such first mentioned or excess speed driving unit will assume the full load delivered to the power receiving shaft and the other driving unit and the corresponding input shaft may be allowed to come to rest or cut out of service. Due to this fact the delivery of power to the power receiving shaft may be smoothly transferred from either power input shaft and drive unit to the other power input shaft and drive unit without need of interrupting the drive of the power receiving shaft or allowing said shaft to come to rest.

In order that some of the benefits and advantages of such an arrangement and form of drive may be better understood and appreciated I outline below a few of the uses to which my present arrangement and disclosures may be placed, but these are outlined only by way of example, and not as any limitation on the uses or objectives to be accomplished by the present invention, except as I may limit myself in the claims to follow.

Types of power units (1) A twin drive may be used where two electric motors of the same speed and capacity would drive the two input shafts simultaneously. This arrangement would be for heavy duty load conditions where for example two 50 H. P. motors might be employed instead of one 100 H. P. motor under normal full load operating conditions. For partial loading which might occur at certain times, one only of the motors might be employed while the other motor would be stationary and not in service. In such case either electric motor might be used for drive, the remaining motor standing idle and non-rotative without being disconnected from its input shaft, such operation being possible due to the arrangement of the "free-wheeling" drives between the two input shafts and the power receiving shaft. When the full power was to be delivered to the power receiving shaft both motors would be used, and they would divide the total power requirement between them, whether they were of the synchronous type or the induction motor type.

(2) A drive might be employed using a high speed electric motor of, say 1800 R. P. M. for full capacity operations, and a smaller lower speed electric motor of, say 10 H. P. at 600 R. P. M. also be provided, for reduced capacity operations at partial loading or for idling conditions at reduced speed and horsepower when this should be necessary. Either motor could be started and operated without need of disconnecting the other motor. In fact, if by chance both motors should be inadvertently started at the same time, no damage woukld result to the equipment. These operations are made possible by the arrangements already outlined, and to be described hereinafter in detail.

(3) A drive may be installed using an electric motor as the main source of power, and an auxiliary drive being provided in the form of an air motor or an internal combustion engine or a steam turbine for use in case of failure of the source of electric power, and in order to keep the power receiving shaft rotating in such an emergency. This would enable the processing to be continued, or it would prevent damage to the equipment being operated by the power receiving shaft, when the idling of such driven equipment might cause serious damage thereto. This might be the case, for example, when the driven equipment was a form of air pre-heater. In such case the ability to continue operation of such equipment, even at materially reduced speed, would prevent serious damage, both to the equipment and to the materials being processed at the time of the emergency.

Types of equipment to be driven (1) A mechanical air preheater, rotary kilns, and certain types of furnaces, all operating at high temperatures and subject to considerable damage in case of sudden power failure making it necessary to discontinue operations without provision of time sufficient to allow the equipment to cool slowly enough to avoid damage, etc. In the case of equipment of this general character the main drive is usually made by means of an electric motor. An auxiliary drive, usually of lower speed and reduced horsepower is generally provided in the form of an air motor, or a multi-cylinder internal combustion engine so that the driven unit may be kept in operation until electrical current is again available, or until the equipment has had time to cool down to a point where no damage will occur as a result of sudden stoppage.

(2) Certain operations are conducted on a cyclic basis, and during a complete cycle a considerable change in horsepower required to conduct the operation occurs. Such change in required power may be due to change in viscosity, density, weight, or volume of the material being processed. Thus, such a drive operation might require 40 H. P. for the first two hours, and only 20 H. P. thereafter as the mixture thins down for the final three hours of the operation. Conversely, the product might be a light or thin mixture at beginning, requiring only 5 H. P. for the first hour, and then thickening of the mixture would require 15 H. P. during the remaining period of the processing. Under such conditions as above outlined, as well as many others a motor of larger capacity may be provided to drive one of the input shafts under the heavy load conditions, and a motor of smaller capacity may be provided to drive the other input shaft for the minimum load requirements. The motors may be of the same or different speeds.

*Types of drives*

(1) The speed or gear ratio from both of the input shafts to the power receiving shaft can be the same for both such input shafts; for example, 20/1, 50/1; or 100/1. Under these conditions the delivered speed of the power receiving shaft would depend on the speed of the input power unit in use divided by such ratio; and by providing power input motors of equal speed the delivered speed of the power receiving shaft would be the same when using either of the power units as when using the other. On the other hand, when the ratios of the two input shafts to the receiving shaft are equal to each other, but the two power units deliver at different speeds (with correspondingly different speeds of the two input shafts), the speed of the power receiving shaft can be changed by changing from drive by one of the power units to the other.

(2) The speeds or gear ratios from the two input shafts to the power receiving shaft may be different. For example, one ratio may be 50/1 and the other ratio, 100/1. If, then the two power motors are of equal delivered speed characteristics, the power receiving shaft may be driven at either of two speeds, corresponding to the motor in use (it being assumed that the gear ratios are different as stated above).

(3) Under the condition of provision of different ratios between the input shafts and the power receiving shaft, an even greater flexiblity of delivered speeds may be provided for by using motor units having themselves different speeds of operation. Thus, with a motor of speed of 1800 R. P. M. connected to the input shaft of ratio of 50/1 to the power receiving shaft, the final delivered speed of the power receiving shaft would be 36 R. P. M., and with a motor speed of 600 R. P. M. for the other motor, and connected to its input shaft of ratio of 100/1 to the power receiving shaft, the speed of such power receiving shaft would then be 6 R. P. M. Thus the total variation of the speed of one power receiving shaft would be 6/1, accomplished by a 3/1 variation in the motor speeds, and a 2/1 variation in the ratios.

(4) The drives of the "free-wheeling" elements between the input shafts and the power receiving shaft may be by gears, sprockets and chains, or pulleys and belts, as desired, and as required to meet specifications.

It is a further and important object and feature of the present invention to provide a gear reducer unit having two input driving shafts or elements both of which are gear connected to the same gear train so that said train may be driven selectively by either such input shaft. Conveniently, and preferably, these two input shafts are located in alignment with each other at opposite sides of the reducer housing. When this arrangement is used the two prime-movers may also be located at opposite sides of the housing and directly connected to their respective input shafts.

It will be seen that when driving the gear train from either prime-mover it is unnecessary, and in fact undesirable, to drive the other prime-mover although such prime-mover may still be connected to its input shaft. By allowing such other or non-driving prime-mover to remain idle when the drive is being effected by its companion, considerable drag on the working prime-mover is avoided, as well as needless bearing and other operation. Furthermore, with this arrangement, in case of need or desire to overhaul or repair either one of the prime-movers, the other one may carry the burden of driving the gear train during the necessary interval. By arranging for each prime-mover to drive directly to its own input shaft the removal of either prime-mover may be effected substantially without any shut-down of the gear train operation, as will be presently apparent.

It is a further and important feature of the present invention that I have provided a common shaft element in the gear train to which both of the input shafts are gear connected. Such common shaft element is located close to the input or high speed shaft end of the gear train, and therefore subject to a comparatively low torque condition. In the construction hereinafter illustrated and described I have provided four speed reductions, and the said common shaft element is the first speed reduction element, and thus operates at a small torque as compared to the torque finally delivered at the output shaft. I then provide a freewheeling or overhauling clutch between each of the input shafts and such common shaft element, such clutches both being arranged for drive from their respective input shafts to the common shaft element for drive of such common shaft element in the same direction. With this arrangement, drive from either input shaft will occur to the common drive element, when the input shafts are respectively rotated in the same direction. That is, when viewing the gear reducer from one side, drive from either input shaft to the common drive element will occur when either input shaft is rotated in the clockwise direction, or when either input shaft is rotated counter-clockwise, as the case may be, according to the intended driving directions of the freewheeling clutches. Thus, drive of the common drive element will always occur in the same and intended direction, whether the drive originate in the one input shaft or the other input shaft.

It is also noted that with this arrangement, when transferring from drive by one shaft to drive by the other shaft the transfer of drive from one prime-mover to the other may be effected without need of bringing the gear train to a rest condition. This is true since by starting up one prime-mover before the other has come to rest, or while such other is slowing down, the transfer of drive from the previously driving unit to the substitute driving unit will occur when the relative speeds of the two input shafts have become such as to cause engagement of the new overhauling clutch with corresponding disengagement of the previously used overhauling clutch. When both of the input shafts are geared to the common shaft element at the same gear ratio it is evident that such condition will occur when the two input shafts are rotating at the same speed. It is evident, however, that even when the two input shafts are geared to the common shaft element, both input shafts being in alignment, the gear ratios between such two input shafts and such common shaft element may be different, if desired. With such an arrangement it would be possible to effect output shaft drive at, say, half speed when driving from one input shaft, as compared with the speed when driving from the other input shaft, while using the same speed of drive for each of the input shafts during its driving operation. Therefore, although I have in the drawings shown a construction in which the gear ratios between both of the input shafts and the common drive shaft are the same, I do not intend to limit myself to such specific arrangement, except as I may do so in the claims to follow.

By locating the freewheeling or overhauling clutches in the drives between the input shafts and the first reduction or common shaft element, and thus at the location of low torque transmission, I am able to use such clutches of comparatively small size, and low cost, and with other attendant advantages. Furthermore, by thus locating these clutches at such location I do not need to divide any of the transmission shaft elements, and am thus enabled to use very simple and rugged constructions of gear reduction elements and save bearings, with the attendant advantages of operation and reduction of cost.

A further and important feature of the invention lies in the provision of a construction which is symmetrical on both sides of the central vertical plane of the device, so that all portions and all elements may be symmetrically assembled or so that driving motors at the two sides of the structure—that is, to the two input shafts—may be set selectively at either side of the housing as required to meet installation requirements. In this connection, I have provided a bracket or like element to support each of the prime-movers, and designed to meet the requirements of size and form of its prime-mover. Nevertheless, these bracket elements, and the housing of the gear reducer itself, are so designed that these two brackets and their prime-movers may be set at those sides of the gear reducer which meet installation and other requirements. In like manner, the output shaft may be extended from either side of the housing so that drive to the driven machine may be effected at either side of the gear reducer unit as required by installation and other conditions.

It is a further feature and object of the invention to provide a very rugged and sturdy construction of gear reducer, and a construction which is very compact and closely knitted.

Other objects and uses of the invention will appear from a detailed description of the same, which consists in the features of construction and combinations of parts hereinafter described and claimed.

Figure 5:
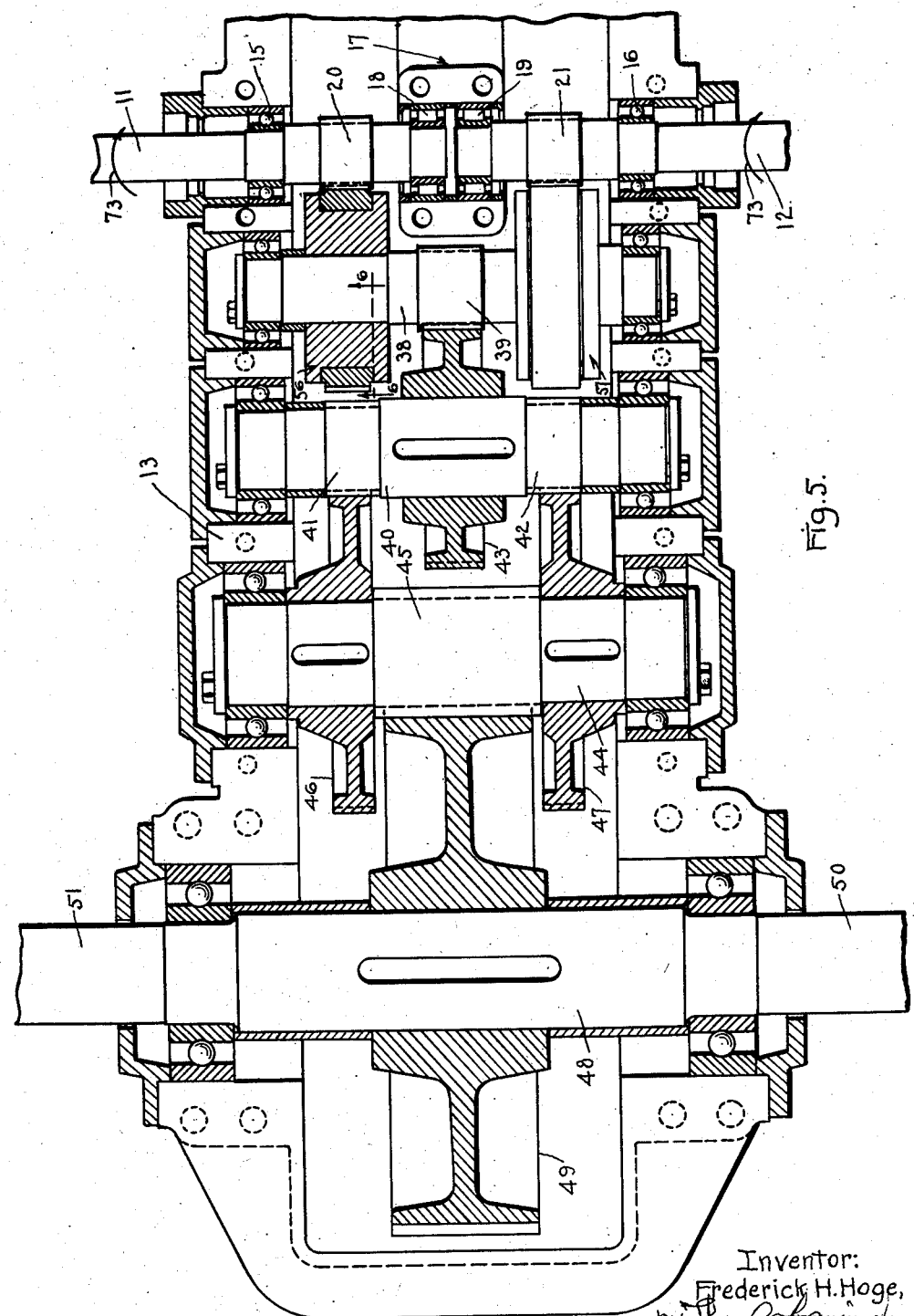
Figure 6:
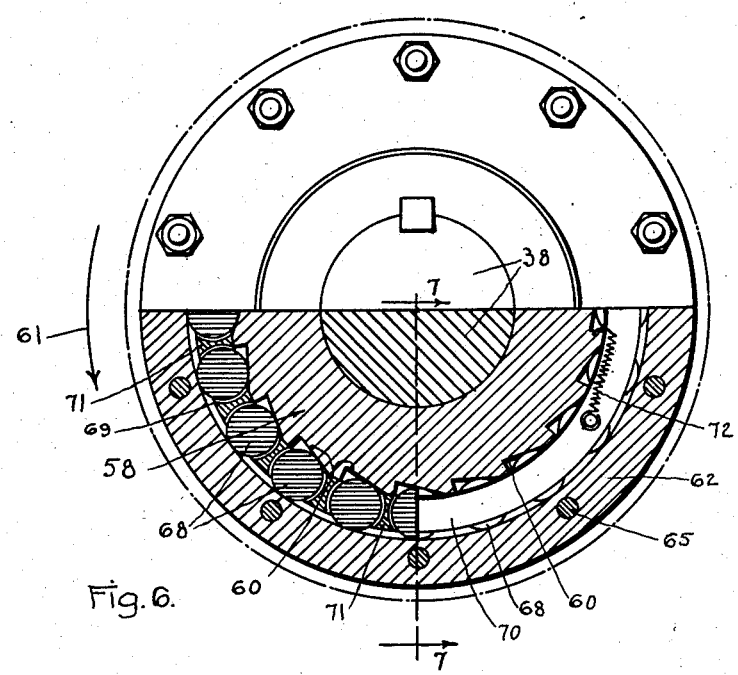
Figure 7:
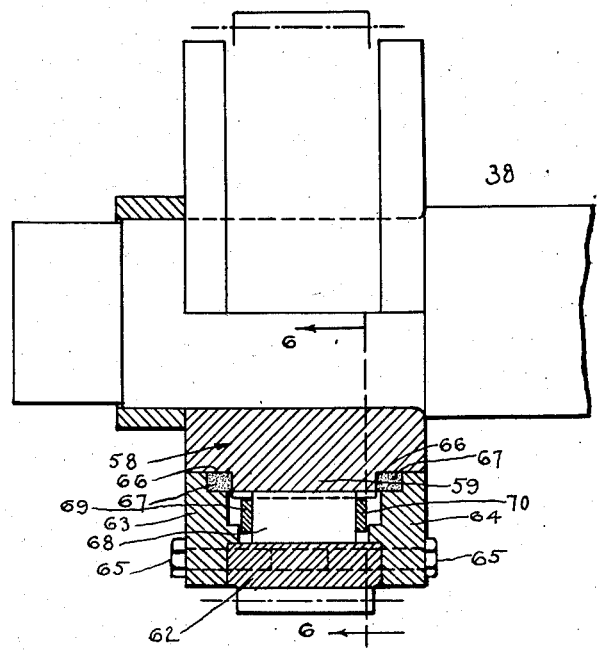

In the drawings:

Figure 1 shows a plan view of a typical gear reducer embodying the features of my present invention, the same being provided with an electric motor for normal drive through one of the input shafts, and with an air motor for emergency drive through the other input shaft; and this figure shows the output or low speed shaft as provided with a pinion which is enclosed by a portion of the housing of a preheater, such pinion driving the large gear (or cross pin element) wheel of an air preheater;

Figure 2 shows a side view of the gear reducer unit shown in Figure 1, looking towards the air-motor side thereof; and this view also shows, schematically, the output pinion of the gear reducer in engagement with the large gear element of the air preheater unit;

Figure 3 shows a right-hand end view of the gear reducer shown in Figures 1 and 2; and this figure shows the electric motor located at the right-hand side of the reducer and the air-motor located at the left-hand side of the reducer, both such motors being carried by laterally extending brackets which are interchangeable for connection to either side of the gear reducer housing and for motor attachments to the two input shafts interchangeably;

Figure 4 shows a left-hand end view of the gear reducer shown in Figures 1, 2 and 3, and it shows the output shaft as provided with lateral extensions to both sides of the housing, one of such shafts being enclosed and protected by a shaft guard;

Figure 5 shows a horizontal or planar view of the gear reducer on substantially double scale as compared to Figures 1, 2, 3 and 4; and this figure shows the upper section of the housing removed so as to show the interior of the device; and in this figure various of the gears are shown in horizontal section, and one of the freewheeling clutches is also shown in horizontal section, the other one being in plan view;

Figure 6 shows a side view of one of the freewheeling units and the gear element which comprises a portion thereof; and in this figure the upper half of the unit is shown in face view and the lower half is shown in section, being a central section taken substantially on the line 6—6 of Figures 5 and 7, looking in the directions of the arrows; and Figure 7 shows a view of the freewheeling unit taken at right-angles to Figure 6; and the lower half of Figure 7 is shown in section taken on the line 7—7 of Figure 6, looking in the direction of the arrows;

Figures 6 and 7 are on substantially larger scale than Figure 5.

In the drawings the speed reducer unit as a whole is designated by the numeral 10. It includes the two input shafts 11 and 12 located in alignment with each other at the input end of the reducer unit. Conveniently the unit includes the lower and upper housing elements 13 and 14, respectively. These are brought together on a horizontal plane which includes various bearings, as will presently appear. Accordingly, the input shafts are journalled at opposite points between the upper and lower housing elements by the roller bearings 15 and 16. The lower housing element includes the stand 17 which extends up from its floor at the input end of the structure; and the inner ends of the input shafts are journalled to this stand by the roller bearings 18 and 19. Thus each input shaft is well journalled and held in alignment. These input shafts are provided with the pinions 20 and 21 between their respective pairs of bearings.

The input shafts both project to the outside of the housing as shown in Figures 1 and 5 in particular. The driving electric motor 22 is supported in alignment with the input shaft 11, a coupling 23 serving to connect the motor shaft 24 to such input shaft. This coupling may be of conventional form to allow, by flexible disk, compensation for slight misalignments of the motor and input shafts. Another "emergency" motor 25 is located and supported in alignment with the input shaft 12, a coupling 26 serving to connect the motor 25's shaft 27 with the input shaft 12. Thus separate motor driving means are provided for the two input shafts.

These motors are supported by the outwardly extending bracket elements 28 and 29, respectively. Each of these brackets includes the floor 30 or 31, and the side walls 32—33 or 34—35 extending upwardly from such floor. These side walls have their inner or housing ends curved inwardly towards each other to provide increased stiffness, and, as shown in Figure 3, said side walls taper in vertical dimension towards their outer ends. These brackets are supported by arms which extend outwardly from the side walls of the lower housing element, such arms being numbered 36 (for the bracket 28) and 37 (for the bracket 29).

In the embodiment shown in the drawings the emergency motor 25 is an air-motor supplied with compressed air from a suitable source available or provided in the plant, so that when the gear reducer is to be operated under emergency conditions motive power independent of the electric supply is used. Thus the operations can be continued for an emergency interval for reasons already explained, or otherwise.

The gear reducer illustrated in the drawings includes four stages of speed reduction. Manifestly, however, a greater or lesser number of such reductions may be provided within the scope of my invention, as will presently appear. Thus, in the illustrated embodiment there are included the shaft 38 carrying the central pinion 39; the shaft 40 carrying the two spaced apart pinions 41 and 42, and also the central gear 43 which meshes with the pinion 39; the shaft 44 carrying the central pinion 45, and also the two spaced apart gears 46 and 47 which mesh with the pinions 41 and 42, respectively; and the output shaft 48 carrying the central gear 49 which meshes with the pinion 45. The shafts 38, 40, 44 and 48 are journalled in suitable roller bearings seated into the lower housing element, as well illustrated in Figure 5. The upper housing element is then set down into place on the lower housing element, thus completing the supports of the bearing raceways in well understodd manner; and suitable ample connections such as bolts are established between the two housing elements to hold them securely together with the raceways in place.

The end portions of the output shaft 48 project out from the two sides of the housing and afford elements to which driven members are to be connected. Usually only one of these projecting shaft portions 50, is used for delivery of power, in which case the other projecting shaft portion 51 may be protected by the cap 52 set over such projecting portion and having its inner end secured to the proximate housing portion. Such cap is shown in Figures 1 and 4.

The embodiment illustrated is intended especially for driving the previously referred to wheel element of an air preheater. Accordingly, in Figures 1 and 2 I have shown more or less schematically the large pinion 53 keyed to the output shaft portion 50 and in Figure 2 I have also shown the large wheel portion 54 which is driven by such large pinion. Usually such large wheel of which 54 is a portion comprises side plates or elements between which are extended cross pins to provide the "teeth" which are engaged or meshed by the teeth of the pinion 53. However, such details of construction do not comprise any portion of my present invention, except insofar as the present gear reducer unit has been designed especially to meet the requirements presented by operating conditions imposed in operations connected with such air preheaters and like units. The housing shown in fragmentary form at 55 in Figure 1 encloses the large pinion and extends over the large gear 54, and prevents loss of air or gases from the preheater unit.

It remains to describe the drive connection from the shafts 11 and 12, and the pinions 20 and 21, to the shaft 38. To this end the overhauling or freewheeling clutches 56 and 57 are located on the shaft 38 opposite to the corresponding pinions 20 and 21 as well shown in Figure 5. Sufficient of the details of one of these clutches is shown in Figures 6 and 7 to which reference is invited. Each of these clutches includes the body portion 58 keyed or otherwise drivingly connected to the shaft 38. The central portion 59 of such body is of increased diameter as compared to the end portions; and such central portion is provided with the several wedge shaped surfaces 60 as shown in Figure 6. These have a rather slight angle as compared to the tangents touching the embracing circle at the location of each such surface so that a wedging action will be produced against the rollers presently to be described. It is here noted that drive of the shaft 38 is to be made in the direction of the arrow 61 in Figure 6. Surrounding the central or body portion 58 is the ring member 62 which is provided with gear teeth to mesh with the pinion 20 or 21 as the case may be, the inner cylindrical surface of such ring member being larger in diameter than the body member 58 as shown in Figure 6. This ring member 62 is laterally connected to the two side rings 63 and 64 as by the tap screws 65; and the rings 63 and 64 are of internal diameter to overlie the peripheral portion of the body element 58, leaving spaces 66 wherein may be accommodated sealing rings 67 of suitable material.

Rollers 68 are seated within the recesses provided by the wedge shaped surfaces 60, and side retainer rings 69 and 70 are provided at the ends of the rollers, such rings being connected by cross elements or portions 71 which clear the rollers with slight clearances but provide pockets within which the rollers are free to rotate. Thus the rings 69 and 70, and the cross elements 71 provide a cage with pockets wherein are located the rollers. A light spring 72 is provided adjacent to one or each of the rings 69 and/or 70, such spring having one end connected to such ring, and its other end connected to the body portion 58. These springs act to urge the cage in direction to move the rollers towards the large diameter portions of the wedge surfaces 60, to thus retain the rollers in wedging engagement between the surfaces 60 and the inner surface of the ring 62. By this means any tendency of the ring element 62 to rotate in the direction of the arrow 61 must be accompanied by a driving action against the body portion 58; but nevertheless a drive of such body portion 58, also in the direction of said arrow, and at greater angular speed than the ring member 62 can be effected since in this case the tendency is to shift the rollers to deeper portions of the sockets within which they are severally accommodated.

It will now be evident that drive of either the shaft 11 or the shaft 12 in the direction of the arrows 73 (see Figure 5) will result in counterclockwise drive of the corresponding ring member 62. In case the shaft 38 is not already being driven counterclockwise at a greater angular rate than such drive of the ring member, a driving effect from the ring member to the shaft 38 (through the body member 58) will ensue. Generally one or the other of the shafts 11 or 12 will be idle when the opposite shaft is being driven, such being the normal operation. Accordingly, the ring 62 corresponding to such idle shaft will be stationary (due to the idleness of the corresponding pinion 20 or 21, as the case may be), and the drive of the shaft 38 counterclockwise by the driving shaft 11 or 12, will result in a freewheeling action at the location of the stationary ring 62. Thus the shaft 38 will be driven by whichever one of the shafts 11 or 12 is being rotated clockwise; and in case both of such shafts are simultaneously rotating clockwise, that shaft rotating at the greater angular velocity will effect the drive to the shaft 38. This fact is of great importance in the case of such installations as that wherein the gear reducer is used for driving the wheel element of an air preheater for the following reason: In case it is desired to shut down the motor 22 for any purpose, the prime mover 25 may be brought into operation, but generally at a speed less than the normal operational speed of the motor 22. Then as the speed of drive of the shaft 38, by drive from the motor 22, becomes reduced to the lower shaft speed of the shaft 12 (by drive from the air-motor 25), such air-motor will assume the driving function, while the speed of the shaft 11 continues to fall and finally to come to rest. The gear reducer will thus continue to transmit power to the output shaft 48, but at reduced speed; but for reasons already explained, such reduced speed operation is frequently acceptable during an emergency condition. Conversely, upon again starting the motor 22, when its speed rises sufficiently to bring its shaft 11 into speed registry with the shaft 12, and as the speed of the shaft 11 rises still higher, the motor 22 will again assume the drive of the output shaft 48, through the train of gears of the reducer. Thus the shaft and connected driven element (such as the air preheater wheel) will again be brought up to full operating speed, never having been allowed to come to a stand-still condition.

It is especially pointed out that such a clutch as that shown in the present drawings is well adapted for transmission of torque at rather high shaft speeds. Under these conditions the torque to be transmitted is correspondingly smaller than would be the case for transmission of the specified power at lower shaft speed. It is therefore desirable to locate the clutches 56 and 57 as close to the input end of the gear train as possible to obtain maximum benefit from this circumstance. It is, however, noted that this type of clutch is admirably adapted to the condition of use in which the outer ring member 62 is used as the driving element. Accordingly, it is seen that by locating these clutches on the first speed reduction shaft (after the input shafts) a relatively high-speed of drive may be secured while at the same time making it possible to effect drive from either of two input shafts (11 or 12) through corresponding clutches, to the common shaft element 38. It is thus evident that I have provided a highly desirable and effective combination of the necessary elements to attain the desired objectives, some of which have been stated previously herein.

It is pointed out that when driving by the use of either input shaft, the other input shaft being idle, the freewheeling clutch arrangement shown in Figures 6 and 7 is such that practically no friction or wear of parts is produced in the idle clutch, since under these operating conditions the ring gear element 62 of such clutch is merely standing idle, while the body portion 58 of such clutch rotates with the shaft 38, the rollers 68 constantly travelling in the larger diameter portions of their respective roller sockets of the cage. If desired suitable oiling provisions may be made for ensuring the provision of oil within the clutches and at the locations of the rollers.

It is noted that although I have in the drawings shown gear drive connections from the input shafts 11 and 12 to the overhauling clutch elements, still other drive means might be used for such drives. For example, chain and sprocket drives might be used in these locations, or V-belt or other suitable belt drives might be substituted in place of such gear drive connections. Therefore I do not intend to limit myself to gear drives except as I may do so in the claims to follow.

I claim:

1. In a gear speed reducer having a plurality of stages of gear speed reduction, the combination of a plurality of shafts, gear connections from shaft to shaft in a series of progressive gear speed reduction from a high speed common shaft element to a low speed power output shaft, end bearings for said shafts, the end bearings for each shaft being located at opposite sides of the vertical medial plane of the gear reducer, two power input shafts adjacent to the high speed common shaft element and located in opposition to said common shaft element at opposite sides of said vertical medial plane and with their adjacent inner ends in proximity to said vertical medial plane, bearings for said inner ends, another bearing for each of said power input shafts spaced apart from the inner end bearing for such shaft, and an overhauling clutch drive connection from each input shaft to the opposite portion of the high speed common shaft, each such overhauling clutch drive connection including a body portion secured to the high speed common shaft at a location opposite to a corresponding input shaft and provided with a series of round body engageable surfaces parallel to the high speed common shaft and spaced circumferentially around the shaft and non-tangential to the radii from such shaft at their respective locations, a ring clutch element surrounding and spaced radially outward from said round body engageable surfaces and provided with an inner cylindrical surface co-axial with the shaft, a series of round bodies located between said round body engageable surfaces and said inner cylindrical surface and of size to simultaneously engage and wedge against such inner cylindrical surface and the round body engageable surfaces for rotary shaft drive from the ring to the corresponding body portion on the shaft when the ring is rotated in one direction at angular speed not less than the rotary speed of such body portion and permitting rotation of the shaft and such body portion in said direction at angular speed greater than the angular speed of such ring, and a driving connection from each input shaft to the corresponding and oppositely located ring clutch element, the round body engageable surfaces of both of the clutch elements being formed for drive from their ring clutch elements to their body portions for rotation of the high speed common shaft element in the same direction of rotation.

2. A speed reducer as defined in claim 1, wherein each ring clutch element is provided with teeth, and wherein each input shaft is provided with a portion having teeth located in opposition to the ring clutch element teeth, and a driving connection from the portion of each input shaft having teeth to the teeth of the corresponding ring clutch element.

3. A speed reducer as defined in claim 2, wherein the teeth of each input shaft are directly engaged with the teeth of the corresponding ring clutch element.

4. A speed reducer as defined in claim 2, wherein the driving ratio from each input shaft to the corresponding ring clutch element is the same as the driving ratio from the other input shaft to the ring clutch element corresponding thereto.

5. A speed reducer as defined in claim 2, wherein the driving ratio from each input shaft to the corresponding ring clutch element is not the same as the driving ratio from the other input shaft to the ring clutch element corresponding thereto.

6. A speed reducer as defined in claim 1, together with a prime mover located in proximity to the outer end of each input shaft, and a driving connection from each prime mover to such input shaft.

7. A speed reducer as defined in claim 6, wherein one prime mover is an electric motor and the other prime mover is an air motor.

8. A speed reducer as defined in claim 6, wherein one prime mover is an electric motor and the other prime mover is an internal combustion engine.

9. A speed reducer as defined in claim 6, wherein the speed ratios of the two input shafts to the corresponding ring clutch elements are the same, and wherein the normal driving speeds of the two prime movers are not the same.

References Cited in the file of this patent

UNITED STATES PATENTS

| 314,207 | Ward | Mar. 17, 1885 |
| 1,708,215 | Chryst | Apr. 9, 1929 |

FOREIGN PATENTS

| 29,672 | Great Britain | Dec. 18, 1909 |
| 577,438 | Great Britain | May 17, 1946 |